(No Model.)

F. P. HART.
STOVEPIPE COUPLING.

No. 481,026.  Patented Aug. 16, 1892.

WITNESSES:
F. McArdle.
C. Sedgwick

INVENTOR:
F. P. Hart
BY
Munn & Co.
ATTORNEYS

UNITED STATES PATENT OFFICE.

FRANCIS P. HART, OF STRASBURG, PENNSYLVANIA.

STOVEPIPE-COUPLING.

SPECIFICATION forming part of Letters Patent No. 481,026, dated August 16, 1892.

Application filed December 9, 1891. Serial No. 414,473. (No model.)

*To all whom it may concern:*

Be it known that I, FRANCIS P. HART, of Strasburg, in the county of Lancaster and State of Pennsylvania, have invented a new and useful Stovepipe-Coupling, of which the following is a full, clear, and exact description.

This invention relates to improved means for connecting together the several sections of a stovepipe at adjacent ends, and has for its objects to provide a simple and inexpensive device which may be easily and quickly applied to the ends of stovepipe-sections and that will effect a neat and secure connection of said ends whether the pipe-sections are adapted to slip-joint together or are of an equal diameter where joined.

To these ends my invention consists in the construction and combination of parts, as is hereinafter described, and pointed out in the claims.

Reference is to be had to the accompanying drawings, forming a part of this specification, in which similar letters of reference indicate corresponding parts in all the figures.

Figure 1:
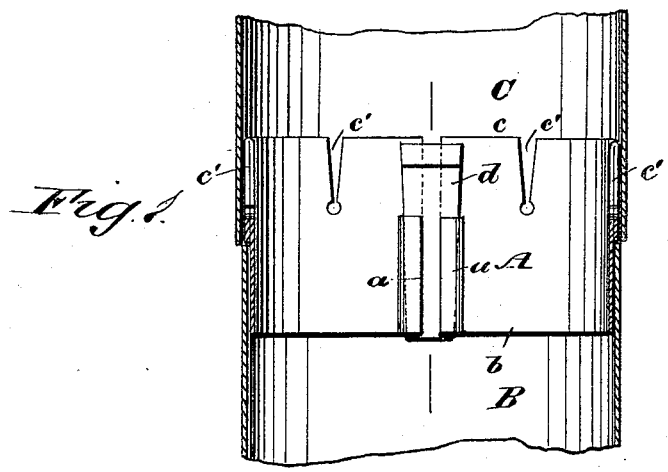
Figure 2:
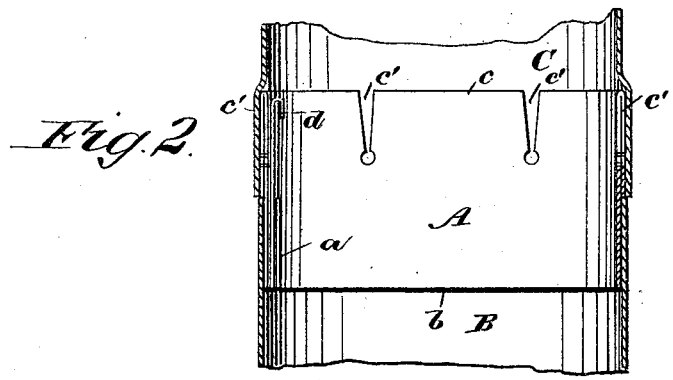
Figure 3:
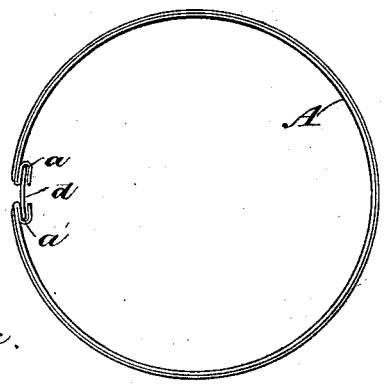

Figure 1 is a longitudinal axial section of the coupling device and two end portions of stovepipe-sections connected by the coupling. Fig. 2 is a longitudinal axial section of the coupling device and two end portions of stovepipe-sections that vary considerably in diameter where they are coupled with the device, and Fig. 3 is an end view of the stovepipe-coupling detached.

Ordinarily stovepipe-sections are slip-jointed together, to effect which one end of a section must be slightly expanded conically and the end of a section that is to engage therewith is slightly contracted in diameter. It frequently happens that when pipe-sections are to be joined that mating sections cannot be found, and in consequence great inconvenience is experienced in assembling the detached pieces. To correct this objectionable feature incidental to stovepipes of ordinary manufacture, the improvement which will be described has been devised, and consists of a short cylindrical sheet-metal sleeve A, that is left unjoined at the adjacent longitudinally-extending edges *a*, whereon return bent hooks are produced internally. These hooks, extending from one end *b* toward the opposite end *c*, may be shorter than the entire length of the sleeve and are so shown. At the end *c* of the sleeve-piece A the material is preferably folded upon the main portion to afford two thicknesses, which serves to render the edge more substantial, which edge is notched at proper intervals in V form, as at *c'*, which will permit the edge portion *c* to be contracted in diameter or expanded, as may be required, and to effect an alteration in the diameter of the entire sleeve-piece A a wedge *d* is provided that engages with the hooked edges *a*, as shown in Fig. 1.

To apply the coupling, the sleeve A is inserted within the end of a pipe-section B until the end of the folded portion of the sleeve is in contact with the end of this pipe-section. Then the key or thin wedge *d* is driven sufficiently to tighten the sleeve in the pipe end. The projection of the sleeve beyond the pipe-section B permits another pipe-section C to be slipped upon this projected part of the sleeve, which, being slitted or notched at *c'* in V form, may be readily contracted by external pressure of the hands, should this be necessary, to enter the end *c*, the elasticity of the coupling end enabling the connection of pipe-sections B C to be effected by simply shoving them together at the ends. If the pipe-sections are of an equal diameter, the sleeve A will effect a close and stable junction of two end portions of the pipe, which will then slightly impinge endwise and will not enter one within the other.

Should there be necessity to couple two stovepipe-sections that are of different diameters, which are not excessive in variation, the notched end *c* of the coupling-sleeve A may be spread manually and by coaction of the wedge *d* be made to have contact with the inner surface of the larger pipe-section, as is indicated in Fig. 2.

It is claimed for this device that when used the stovepipe-section need not slip together but a slight degree and be maintained in connection substantially, the sleeve-piece A within having such an extended bearing as will render the junction of parts stable. Furthermore, it is claimed that the use of the stovepipe-coupling herein described will preserve the end portions of the pipe from rusting.

Having thus described my invention, what I claim as new, and desire to secure by Letters Patent, is—

1. A stovepipe-coupling comprising an open sleeve having one end notched to permit the said end to be contracted or expanded and provided with means for bodily expanding the sleeve, substantially as described.

2. A stovepipe-coupling comprising an open sleeve having one end notched and provided along its inner longitudinal edges with hooks and a wedge or key fitting in and between said hooks, substantially as described.

3. A stovepipe-coupling comprising a sleeve-piece having one end portion folded to double its thickness and longitudinally notched V-shaped, and at intervals the unjoined longitudinal edges of said sleeves being provided with hooks folded internally, and a thin wedge or key insertible between and within said hooks, substantially as described.

FRANCIS P. HART.

Witnesses:
FRANK L. MUSSELMAN,
WM. D. CHANDLER.